US011422995B1

(12) United States Patent
Marcus et al.

(10) Patent No.: US 11,422,995 B1
(45) Date of Patent: Aug. 23, 2022

(54) ENHANCED DATABASE AND USER INTERFACE INCORPORATING PREDICTED MISSING DATA

(71) Applicant: Talenya Ltd., Rosh HaAyin (IL)

(72) Inventors: David J. Marcus, Potomac, MD (US); Doron Segal, Hoshaya (IL)

(73) Assignee: Talenya Ltd., Rosh HaAyin (IL)

( * ) Notice: Subject to any disclaimer, the term of this patent is extended or adjusted under 35 U.S.C. 154(b) by 0 days.

(21) Appl. No.: 17/544,980

(22) Filed: Dec. 8, 2021

Related U.S. Application Data

(60) Provisional application No. 63/148,186, filed on Feb. 11, 2021.

(51) Int. Cl.
*G06F 16/00* (2019.01)
*G06F 16/215* (2019.01)

(52) U.S. Cl.
CPC .................. *G06F 16/215* (2019.01)

(58) Field of Classification Search
None
See application file for complete search history.

(56) References Cited

U.S. PATENT DOCUMENTS

| 6,704,720 B2* | 3/2004 | Arai | G06F 16/2462 707/999.005 |
| 2019/0364154 A1* | 11/2019 | Hermanek | H04L 51/22 |
| 2020/0372982 A1* | 11/2020 | Nikolova-Simons | G16H 50/30 |

* cited by examiner

*Primary Examiner* — Bai D Vu (57) ABSTRACT

A method, system and computer program product for enhanced database and user interface incorporating predicted missing data. A reference record in a database comprising a plurality of values divided into a plurality of categories is received. A comparison computational operator for calculating similarity score is defined using criteria for determining a level of match between values of the reference record and a record compared thereto in each of the plurality of categories. Top ranked records according to the similarity score are selected, and for values included therein in a category of the plurality of categories, a frequency score comprising a count aggregated per similarity score of containing records is calculated and according thereto a set of missing values in the reference record is selected for enhancement of the reference record and/or presentation via a user interface.

16 Claims, 3 Drawing Sheets

ND USER
ENHANCED DATABASE AND USER INTERFACE INCORPORATING PREDICTED MISSING DATA

RELATED APPLICATION(S)

This application claims the benefit of priority under 35 USC § 119(e) of U.S. Provisional Patent Application No. 63/148,186 filed on Feb. 11, 2021, the contents of which are all incorporated by reference as if fully set forth herein in their entirety.

FIELD AND BACKGROUND OF THE INVENTION

Some embodiments described in the present disclosure relate to information systems and, more specifically, but not exclusively, to an enhanced database and user interface incorporating predicted missing data.

Database systems are mighty tools allowing storage and retrieval of data in a structured manner on user demand. Information retained in a database may be researched by way of executing a query which describes or represents the data requested or certain attributes thereof, yielding in return a set of matched results which may be reviewed via a suitable user interface, for example, or transferred to one or more other actors for further processing and/or analysis.

Prominent examples of everyday life practical applications of database systems include patient medical records, job candidate profiles, police case files, and/or the like.

SUMMARY OF THE INVENTION

It is an object of the present disclosure to describe a system and a method for enhanced database and user interface incorporating predicted missing data.

The foregoing and other objects are achieved by the features of the independent claims. Further implementation forms are apparent from the dependent claims, the description and the figures.

According to an aspect of some embodiments of the disclosed subject matter there is provided a method for database enhancement using missing data prediction, comprising: receiving a reference record in a database comprising a plurality of records each comprising a plurality of values divided into a plurality of categories; defining a comparison computational operator configured for calculating a similarity score relative to the reference record of a record compared thereto, using a plurality of criteria for determining a level of match between values of the record and the reference record in each of the plurality of categories; for each of a collection of records comprising at least a subset of the database, applying the comparison computational operator to obtain a respective similarity score; ranking records of the collection according to the similarity score obtained therefor and selecting therefrom a sub-collection of top ranked records; for each of at least one category selected from the plurality of categories: determining a set of predicted values comprising each value in the category included in at least one record of the sub-collection; calculating for each value in the set of predicted values a frequency score comprising a count aggregated according to the similarity score of records of the sub-collection including the value in the category; selecting from the set of predicted values according to the frequency score calculated for each, a set of missing values in the reference record; and, enhancing the reference record using the set of missing values.

According to another aspect of some embodiments of the disclosed subject matter there is provided a method for enhancement of a user interface to a database using missing data prediction, comprising: receiving a reference record in a database comprising a plurality of records each comprising a plurality of values divided into a plurality of categories; generating a plurality of criteria for determining a level of match between values of the reference record and a record compared thereto in each of the plurality of categories; defining using the plurality of criteria a comparison computational operator configured for calculating a similarity score of the compared record relative to the reference record; applying the comparison computational operator to each of a collection of records comprising at least a subset of the database; ranking records of the collection according to the similarity score obtained from applying the comparison computational operator and selecting a sub-collection of top ranked records therefrom; for each of at least one category selected from the plurality of categories: determining a set of predicted values comprising each value in the category included in at least one record of the sub-collection; calculating for each value in the set of predicted values a frequency score comprising a count aggregated according to the similarity score of records of the sub-collection including the value in the category; selecting from the set of predicted values according to the frequency score calculated for each, a set of missing values in the reference record; and, presenting via the user interface at least a portion of the set of missing values.

According to yet another aspect of some embodiments of the disclosed subject matter there is provided a system for database enhancement using missing data prediction, comprising: a processing circuitry adapted to execute a code for receiving a reference record in a database comprising a plurality of records each comprising a plurality of values divided into a plurality of categories; defining a comparison computational operator configured for calculating a similarity score relative to the reference record of a record compared thereto, using a plurality of criteria for determining a level of match between values of the record and the reference record in each of the plurality of categories; for each of a collection of records comprising at least a subset of the database, applying the comparison computational operator to obtain a respective similarity score; ranking records of the collection according to the similarity score obtained therefor and selecting therefrom a sub-collection of top ranked records; for each of at least one category selected from the plurality of categories: determining a set of predicted values comprising each value in the category included in at least one record of the sub-collection; calculating for each value in the set of predicted values a frequency score comprising a count aggregated according to the similarity score of records of the sub-collection including the value in the category; selecting from the set of predicted values according to the frequency score calculated for each, a set of missing values in the reference record; and, enhancing the reference record using the set of missing values.

According to yet another aspect of some embodiments of the disclosed subject matter there is provided a system for enhancement of a user interface to a database using missing data prediction, comprising: a processing circuitry adapted to execute a code for: receiving a reference record in a database comprising a plurality of records each comprising a plurality of values divided into a plurality of categories;

generating a plurality of criteria for determining a level of match between values of the reference record and a record compared thereto in each of the plurality of categories; defining using the plurality of criteria a comparison computational operator configured for calculating a similarity score of the compared record relative to the reference record; applying the comparison computational operator to each of a collection of records comprising at least a subset of the database; ranking records of the collection according to the similarity score obtained from applying the comparison computational operator and selecting a sub-collection of top ranked records therefrom; for each of at least one category selected from the plurality of categories: determining a set of predicted values comprising each value in the category included in at least one record of the sub-collection; calculating for each value in the set of predicted values a frequency score comprising a count aggregated according to the similarity score of records of the sub-collection including the value in the category; selecting from the set of predicted values according to the frequency score calculated for each, a set of missing values in the reference record; and, presenting via the user interface at least a portion of the set of missing values.

According to yet another aspect of some embodiments of the disclosed subject matter there is provided a computer program product for database enhancement using missing data prediction, comprising: a non-transitory computer readable storage medium; program instructions for executing, by a processor, a method comprising: receiving a reference record in a database comprising a plurality of records each comprising a plurality of values divided into a plurality of categories; defining a comparison computational operator configured for calculating a similarity score relative to the reference record of a record compared thereto, using a plurality of criteria for determining a level of match between values of the record and the reference record in each of the plurality of categories; for each of a collection of records comprising at least a subset of the database, applying the comparison computational operator to obtain a respective similarity score; ranking records of the collection according to the similarity score obtained therefor and selecting therefrom a sub-collection of top ranked records; for each of at least one category selected from the plurality of categories: determining a set of predicted values comprising each value in the category included in at least one record of the sub-collection; calculating for each value in the set of predicted values a frequency score comprising a count aggregated according to the similarity score of records of the sub-collection including the value in the category; selecting from the set of predicted values according to the frequency score calculated for each, a set of missing values in the reference record; and, enhancing the reference record using the set of missing values.

According to yet another aspect of some embodiments of the disclosed subject matter there is provided a computer program product for enhancement of a user interface to a database using missing data prediction, comprising: a non-transitory computer readable storage medium; program instructions for executing, by a processor, a method comprising: receiving a reference record in a database comprising a plurality of records each comprising a plurality of values divided into a plurality of categories; generating a plurality of criteria for determining a level of match between values of the reference record and a record compared thereto in each of the plurality of categories; defining using the plurality of criteria a comparison computational operator configured for calculating a similarity score of the compared record relative to the reference record; applying the comparison computational operator to each of a collection of records comprising at least a subset of the database; ranking records of the collection according to the similarity score obtained from applying the comparison computational operator and selecting a sub-collection of top ranked records therefrom; for each of at least one category selected from the plurality of categories: determining a set of predicted values comprising each value in the category included in at least one record of the sub-collection; calculating for each value in the set of predicted values a frequency score comprising a count aggregated according to the similarity score of records of the sub-collection including the value in the category; selecting from the set of predicted values according to the frequency score calculated for each, a set of missing values in the reference record; and, presenting via the user interface at least a portion of the set of missing values.

Optionally, the comparison computational operator being configured for aggregating according to a plurality of relevance parameters the level of match determined in each of the plurality of categories by the plurality of criteria, each of the plurality of relevance parameters being assigned to a respective category of the plurality of categories according to a relative influence thereof on predicting missing values in the at least one category selected.

Optionally, the comparison computational operator being configured for aggregating multiple criteria in a category according to a scarcity measure of values in records of the collection.

Optionally, the comparison computational operator being configured for aggregating multiple criteria in a category according to a function series of a decay rate parameter.

Optionally, the reference record comprising at least one nested value in at least one nesting level, wherein the comparison computational operator being configured for applying the plurality of criteria recursively starting from a maximal nesting level.

Optionally, the method further comprising presenting at least a portion of the set of missing values via a user interface in a manner indicative of values of the at least a portion being predicted values missing from the reference record.

Optionally, values of the at least a portion of the set of missing values being presented in a manner indicative thereof as being predicted values missing from the reference record.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

In the drawings.

DESCRIPTION OF SPECIFIC EMBODIMENTS OF THE INVENTION

Some embodiments described in the present disclosure relate to information systems and, more specifically, but not exclusively, to an enhanced database and user interface incorporating predicted missing data.

In many practical applications, data retained in records of a database may be incomplete or lacking due to various reasons. For example, the data may originate from a source that is not necessarily reliable, such as the case may be when relying on self-reporting by a data subject. Another example may be corruption and/or loss of data, e.g., due to malfunctions, data coding errors, failures in data conversion between formats and/or platforms, and/or the like.

One exemplary scenario considered illustrative for purposes of the present disclosure is a database of professional profiles of persons, also referred to herein as "talents", that can be queried and researched for choosing therefrom suitable candidates or applicants for a job opening based on contents of their respective profiles, i.e., qualifications and/or skills specified therein.

Empirical findings show however that talents often omit mentioning, in a resume or talent profile, some of the skills they possess. They either forget to include them, or they feel that the skills are not relevant or impressive enough, or they are trying to cut back on the length of their profile/resume. Automated methods of matching a talent profile with a job requirement rely on the profile being as complete as possible when it comes to skill sets. Missing (omitted) skills can greatly reduce a match score of a talent profile with respect to a job requirement, even to a point that a qualified talent is deemed a non-match and becomes excluded from being considered for the job.

Prediction of missing skills may be performed based on three key premises: (1) Similar talents have similar talent profiles; (2) Not all skills are recorded in a talent profile; (3) Missing skills can be generated from similar talent profiles.

In some embodiments, a prediction of data missing from a record in a database may be made by identifying in the database a group of records bearing resemblance to the record for which the prediction is to be made and selecting at least one value from one or more records in the group that is absent from the record at hand.

Optionally the predicted missing data may be used for enhancement of the database by supplementing the record in question with the selected value(s).

Additionally or alternatively, the predicted missing data may be presented to a user via a user interface, such as for example during when the user reviewing that record.

Optionally the predicted missing data may be presented to the user along with an indication of the selected value(s) being obtained as predicted missing data.

In some embodiments, each of a plurality of records in a database may comprise a plurality of values, also referred to herein as "record elements", divided into a plurality of categories. Each of the plurality of values may be either a scalar value or a collection (i.e., a vector) of values where each element of the vector may itself be a scalar or a further multi-valued element nested therein, where such nesting may continue down to any arbitrary depth.

Given a reference record of the database, a set of most similar records of the database relative to the reference record may be identified using a comparison computational operator, configured for calculating a similarity score relative to the reference record of a record compared thereto. The comparison computational operator may be defined using a plurality of criteria for determining a level of match between values of the record and the reference record in each of the plurality of categories. The respective levels of match determined by the plurality of criteria may be aggregated using a plurality of respective importance parameters (e.g., weights and/or the like) defined for each record element (and, recursively, sub-elements when a record element is a vector).

The set of most similar records may be determined by applying the comparison computational operator on each record in a collection of the plurality of records in the database or a subset thereof to obtain a respective similarity score, ranking records of the collection according to the similarity score obtained for each and selecting a sub-collection of top ranked records therefrom. The sub-collection may be selected, for example, as the N top ranked records, where N is a configurable natural number. Additionally or alternatively, a record may be included in the sub-collection only if the similarity score thereof exceeds a defined threshold.

Using the set of most similar records, for each unique individual value in a record of the set in a respective one of the plurality of categories, a frequency score may be calculated, such as for example, as a count of records in the set containing that value in the respective category, aggregated by the respective similarity score calculated for each and, optionally, divided by a total number of records in the set of most-similar records. These unique values may be adjoined together into a set of predicted values. Any value for which the frequency score exceeds a defined threshold may be considered a derived value. Any derived value not already present in the reference record may be considered a missing value.

Optionally, a confidence level as to whether a missing value being indeed a value omitted from the record may be calculated, for example, as a fraction of records in the set of most-similar records which comprise the missing value, as a ratio between the frequency score of the missing value and a total number of records in the set of most-similar records (or as the frequency score itself if already normalized by such division), and/or the like.

Optionally, machine learning algorithms may be used to tune one or more of the defined thresholds and/or aggregation parameters (e.g., weights) discussed herein in order to optimize a rate of true positives and/or reduce a rate of false positives.

An exemplary procedure for predicting missing values and computing a confidence level for each derived value being a true positive may be outlined as follows: (a) Select a reference record for which to determine missing values and associated confidence levels; (b) Find top-N most-similar records relative to the reference record; (c) Identify derived values defined as most common values in the most-similar (top-N) records; (d) Determine missing values as most common values not already possessed by the reference record.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
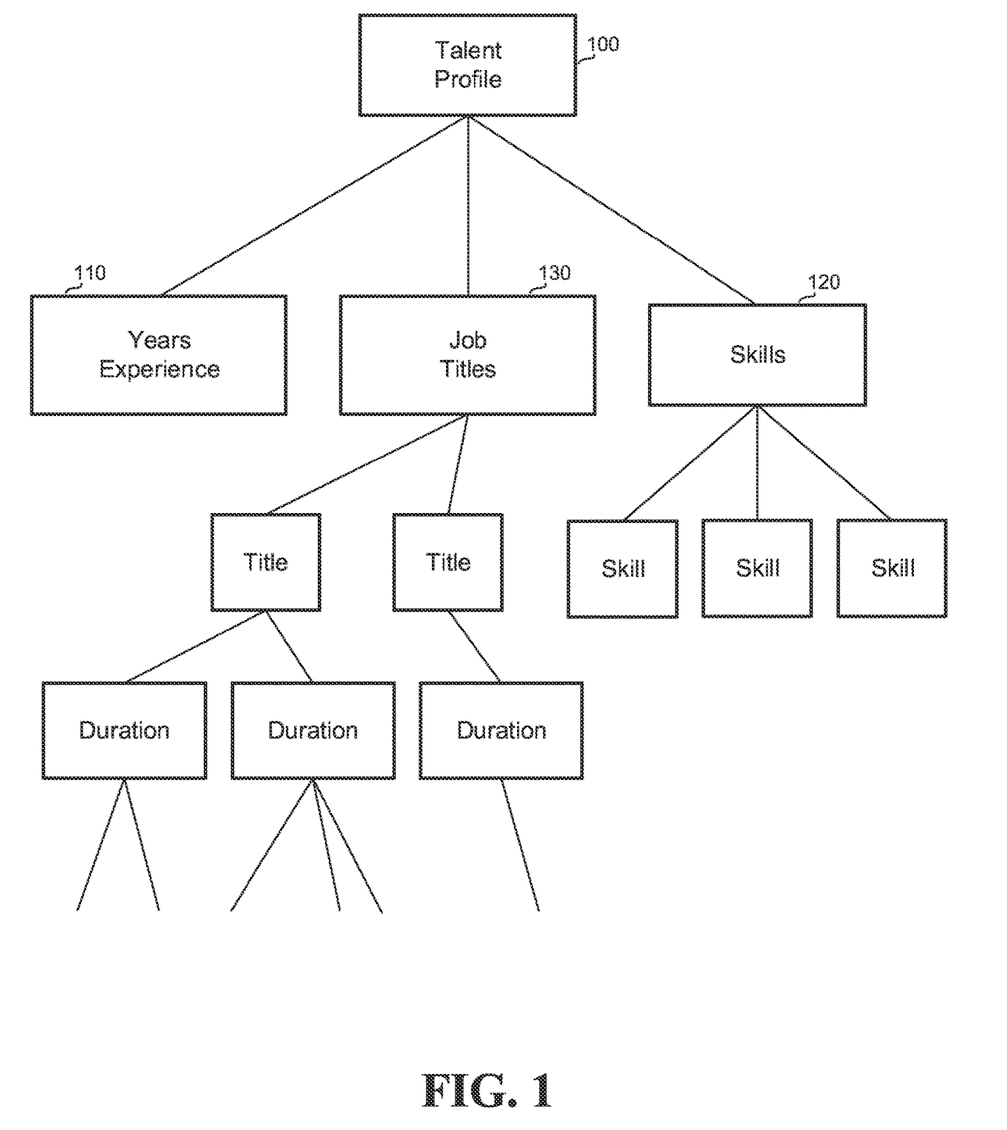
FIG. 1 is a schematic illustration of an exemplary database record in a hierarchical structure representation, according to some embodiments.

Reference is now made to FIG. 1, which is a schematic illustration of an exemplary database record in a hierarchical structure representation, according to some embodiments.

As shown in FIG. 1, a general logical format of data being retained in one of a plurality of records in a database, and similarly of a set of search criteria being used for retrieval of such data, may be a tree-like hierarchical structure, such as a directed acyclic graph (DAG) and/or the like. A node of the graph may be either a leaf, i.e., having no child nodes, or a parent node of one or more child nodes. Further, from any node in the tree there exists a unique path to the root node which is therefore an ancestor of all nodes.

A tree graph may be computationally mapped to a vector where leaf nodes of the tree (ones with no child nodes) being mapped to scalar values of a vector element, while parent nodes in the tree with child nodes being mapped to a sub-vector, recursively.

For illustrative purposes, the disclosed subject matter is described and exemplified herein with reference to a database of talent profiles. The disclosed subject matter however is not meant to be limited in such manner and can be equally applied to any collection of similarly structured data records where a set of likely-to-be-missing property values is to be predicted.

A database record of a talent profile such as 100 in FIG. 1, may be a collection of data elements, also referred to herein as "profile properties", which may include, for example: skills, job titles, schools, seniority level, language proficiencies, location, years of experience, and/or the like. A profile property may be a scalar value, such as 110 in FIG. 1, which may represent years of experience and/or the like. Additionally or alternatively, the profile property may be a collection of scalars, such as 120 in FIG. 1, which may represent skills and/or the like. Further additionally or alternatively, the profile property may be a collection of scalars and/or collections nested to arbitrary depth, such as 130 in FIG. 1 which may represent job titles and/or the like.

A talent profile such as 100 can be mapped onto a tree graph where the root may be assigned the label "Talent Profile". Each primary property of the talent profile 100 may be represented as a direct child from the root. A direct property may be a scalar value, in which case a child node of the root representing the direct property may be a leaf of the tree (having no further child nodes). Alternatively, the direct property may be multi-valued, in which case a child node of the root representing the property may itself become a parent node to child nodes composed of the respective multiple values. The mapping may be applied recursively to any depth as described herein.

A tree graph for a talent profile instance may be such as depicted in FIG. 1, where a node labeled "Years Experience" such as 110 may be a leaf node (having no child nodes), a node labeled "Skills" such as 120 may be a multi-valued property at a depth of one (having child nodes all of which being leaf nodes), a node labeled "Job Titles" such as 130 may be a multi-valued property with further nested multi-valued elements (having child nodes which, in and of themselves, being parents and/or ancestors of leaf nodes in the tree graph), and/or the like.

Figure 2:
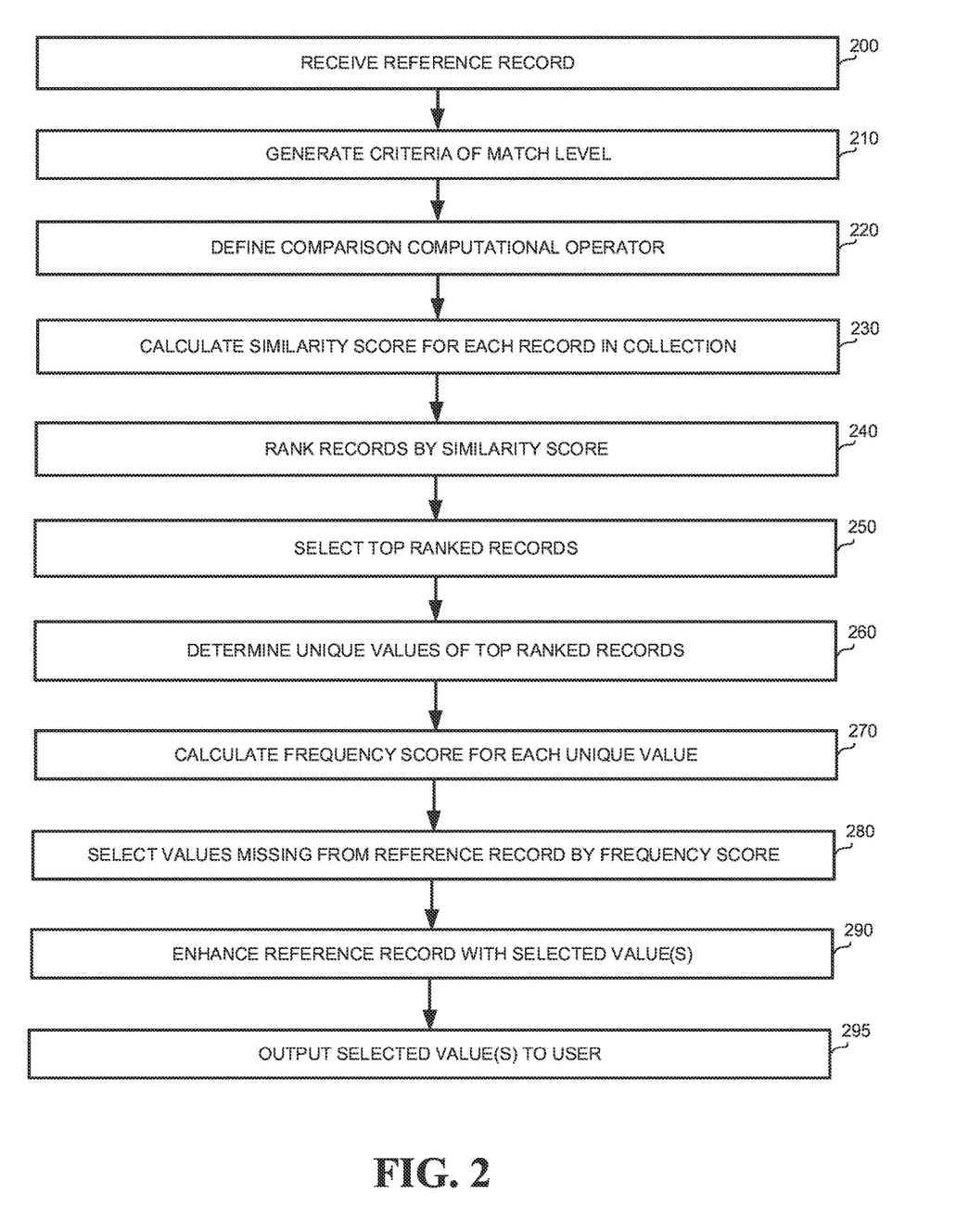
FIG. 2 is a flowchart schematically representing an optional flow of operations for database enhancement using missing data prediction, according to some embodiments.

Reference is now made to FIG. 2, which is a flowchart schematically representing an optional flow of operations for database enhancement using missing data prediction, according to some embodiments.

At 200, a reference record in a database for which missing data prediction is to be performed may be received. The reference record may be either selected manually by a user or via an automated procedure. The reference record may comprise a plurality of values which may be divided into a plurality of categories. In some embodiments, one or more confidence level thresholds for associated confidence levels of predicted missing values in one or more of the plurality of categories may be received as well.

At 210, a set of criteria for determining a level of match between values of the reference record received at 200 and a record of the database being compared thereto may be generated.

In some embodiments, the criteria may be designed similarly to search criteria used for retrieval of records with contents matching a set of desired attributes, whether wholly or partially. Searching a collection of records may require one or more value criteria for each of a plurality of data elements in a record selected to be queried, where the data elements may be, for example, record properties, value categories, and/or the like. Each criterion may specify at least one value to be matched against a respective record property via a comparison computational operator (e.g., a function) reflecting a degree of matching, which may be a normalized numerical value in a range of [0, 1]. A degree of matching of 0.0 may denote a complete non-match. A degree of matching of 1.0 may indicate a complete match. Any value in-between may signify a partial match where the value may be closer to 1 as better the match being and vice versa.

At 220, a comparison computational operator for calculating a similarity score of a record of the database relative to the reference record may be defined using the set of criteria generated at 210.

In some embodiments, the set of search criteria may be computationally mapped onto an N-dimensional vector, where 'N' may be a number determined by a number of top-level categories present in an associated query as may be derived from the reference record received at 200. A value of the number N may satisfy 1<=N<=M, where M may be a maximum number of top-level categories in a database record (i.e., children of a root node in a tree graph representation of the record), such that one vector element (axis) may be obtained per each top-level record property (category of values) being queried. Each coordinate (axis) of the vector may represent one of the top-level categories in the associated query. The vector may be denoted as: $A=[A_1, A_2, A_3, \ldots A_N]$, where $A_i$ may be a match level of a record against the $i^{th}$ criterion, subject to: $0 \leq A_i \leq 1$.

For vector elements being themselves a vector, as may be for example in a case corresponding to querying a multi-valued record property and/or the like, respective sub-vector spaces may be recursively defined, where a number of elements in each may be a number of criteria specified for the queried multi-valued record property, with analogous constraints on a plurality of respective sub-vector elements $\{A_{ij}\}$.

For instance, as an illustrative example, assuming that a third record property being queried for dual values, the vector mapping may be denoted as: $A=[A_1, A_2, [A_{31}, A_{32}], \ldots A_N]$.

In some embodiments, a similarity score of a record may be calculated at a top level (corresponding to child nodes of a root node) using a measure denoted as "weighted length" of a vector, defined as in formula (1) which follows:

$$\text{weighted length} = \frac{\sum_{1}^{N} w_i A_i}{\sum_{1}^{N} w_i} = \frac{1}{\left(\sum_{1}^{N} w_i\right)} \sum_{1}^{N} w_i A_i \qquad (1)$$

where $w_i$ are positive weights ($w_i > 0$).

Notably, the set of weights, $\{w_i\}$, may allow assigning priority (being representative of an ascribed greater relevance and/or the like) to certain search criteria over others as mapped by respective vector elements when scoring selected record properties. As an illustrative example, in case of talent profiles being queried for predicting missing skills, higher weights may be assigned to a query of skills and lower ones for a query of language proficiency.

It may also be noted that the measure of weighted length being constrained to a normalized range of [0, 1], namely: 0≤weighted length≤1 and having a desired property of being 0 if none of the record's properties match their respective criteria; being 1 if all match; and being in-between if some match.

For nested vector elements (where a vector element being itself a vector), a fuzzy AND/OR logic between criteria may be defined. For example, successive powers of a decay rate, R, may be introduced into a calculation of the measure of weighted length, as in formula (2) for calculating a measure of "nested weighted length" of a vector which follows:

$$\text{nested weighted length} = \frac{1}{\left(\sum_{1}^{n} w_i R^i\right)} \sum_{1}^{n} w_i R^i A_i \text{ where } R > 0 \qquad (2)$$

For fuzzy OR the decay rate R may be chosen to be 0<R<1 where successive powers of R get smaller. This may produce a desired computational impact where a contribution of a leading matching term being highest and each successive matching term may have decreasing influence on the measure of nested weighted length. This means that even if there may be just one criterion matching, the nested weighted length may already be high (as one would expect from a fuzzy OR).

For fuzzy AND the decay rate R may be chosen to be 1<R where successive powers of R get larger. This may produce a desired computational impact where a contribution of a leading matching term being least and each successive matching term may have increasing influence on the nested weighted length. This means that with only a few matching terms, the score may be low and may grow as a number of non-zero criteria scores increases (as one would expect from a fuzzy AND).

Optionally a value of R may be learned using machine learning applied to historical searches, for example.

Respective measures of nested weighted lengths of vector elements may be calculated from a deepest nesting level first with the result being provided as a scalar value to a parent vector element and so forth in a recursive manner.

Referring now back to FIG. 2, at 230 a similarity score may be calculated for each of a collection of records of the database by applying thereto the comparison computational operator defined at 220.

To calculate a similarity score of a database record instance, a measure of a weighted length of a vector mapping thereof may be calculated (and any nested weighted length measure of a sub-vector therein as necessary). The weighted length (always a number guaranteed to be in a range of [0, 1] inclusive, by construction) may represent the record's match score relative to a query comprised of the set of search criteria, and, optionally, respective relevance parameters (where applicable). The closer to 1 the result may be, the greater the match level (and closer to 0 the result may be, the lesser the match level).

It will be appreciated that while in an exemplary outline of calculating a similarity score as described herein, a weighted sum being used for aggregating a plurality of match levels determined by each of a set of search criteria, the disclosed subject matter however is not meant to be limited in such manner, and any other suitable aggregation scheme may be employed as well, such as for example, the levels of match may be taken in as factors of a product where respective relevance parameters and/or decay rate power series (whenever applicable) may be introduced as exponents, and/or the like.

At 240, records of the collection may be ranked by the respective similarity score obtained for each at 230.

At 250, top ranked records of the collection may be selected into a sub-collection. The selection may be by numeric criteria, e.g., top ranking N records, where N being a configurable natural number. Additionally or alternatively, threshold criteria may be used, e.g., top ranked records having a similarity score greater than a defined threshold value. Further additionally or alternatively, any likewise selection criteria may be used.

At 260, one or more individual unique values of records in the sub-collection selected at 250 may be determined.

At 270, a frequency score may be calculated for each of the unique values determined at 260. The frequency score may be calculated as a sum of respective similarity scores of records in the sub-collection at which the value being present for a same category.

At 280, a set of missing values in the reference record received at 200 may be selected by the respective frequency scores calculated at 270. For example, a set of derived values comprising each unique value having a frequency score greater than a defined threshold may be determined, and a set of values missing from the reference record may be selected from the set of derived values. Optionally, a confidence level of a missing value being a true positive, i.e., omitted from the reference record by error or otherwise unduly lost, may be calculated too, using the frequency score and/or the like.

At 290, the reference record received at 200 may be enhanced with the set of values selected at 280 or a portion thereof.

At 295, the set of values selected at 280 may be outputted to a user, in addition to or in lieu of enhancement of the reference record at 290.

one exemplary practical application that the disclosed subject matter may be utilized for is prediction of missing skills in a talent profile being selected from a database of talent profile instances.

A general outline for predicting missing skills according to some embodiments of the disclosed subject matter may be as the following:

(i) Select a reference talent profile, from the database of talent profile instances, for which to determine the missing skills and associated confidence levels;

(ii) Generate a search query with a separate criterion for each property value of the reference talent profile. Each criterion, when applied to any talent profile instance, may test for the value being present in the instance. A plurality of weights used at a top-level of the reference talent profile may reflect a relevance of the property towards predicting missing skills. Similarly, nested criteria may use a machine learned decay rate R value reflecting a fuzzy AND/OR logic of the property's values.

(iii) Apply the generated search criteria to a collection of talent profile instances, being either the database in entirety or some subset thereof. Collect a set of top-N talent profiles (where N may be configurable manually or based on machine learning) being most similar to the reference talent profile, subject to a supplied threshold ($0 \leq threshold \leq 1$), denoted herein as the set of most-similar talent profiles.

(iv) Identify the most common skills in the most-similar (top-N) talent profiles by:
  (a) for each unique skill value in all the talent profiles in the set of the most-similar talent profiles, sum the match level of the talent profile and divide by N (the count of talent profiles in the most-similar set). This computes the weighted count of the skill value. A low value implies that few of the top N talent profile instances have this particular skill (i.e., it is more rare among the top talents) and thus is not likely to be a missing skill. A high value implies that the skill is shared among high matching talent profiles.

(v) Select all the skills with a weighted count above a specified threshold, denoted herein as the set of predicted skills.

(vi) The missing skills may be selected from skills in the set of predicted skills not already possessed by the reference talent profile.

It will be appreciated by a person skilled in the art that according to some embodiments of the disclosed subject matter, a skill that is very common among the top N talent profiles but not present in the reference talent profile may be determined, wherein such skill (or similarly any other talent profile property) may be designated as a missing skill of the reference talent profile.

To further clarify how the disclosed subject matter may be utilized in practical applications such as prediction of missing skills of a talent profile as described herein, a simplified worked out example which highlights the salient features thereof is detailed herein.

For illustration purposes, an exemplary database of talent profile records may have three data elements as the following (similarly as in FIG. 1):
  (a) Skills (multi-valued property/category)
  (b) Language proficiencies (multi-valued)
  (c) Years of Experience (a scalar value)

Further, the exemplary database may comprise four exemplary records as follows:

Record #1:
  Skills: ["Java programmer", "Algorithms", "Javascript", "Networking"]
  Language proficiencies: ["English, 3 years"]
  Years of Experience: 8
Record #2:
  Skills: ["C# programmer", "Networking"]
  Language proficiencies: ["English, 5 years", "French, 2 years"]
  Years of Experience: 10
Record #3:
  Skills: ["C# programmer", "Java programmer", "Algorithms", "Networking", "Python"]
  Language proficiencies: ["English, 1 year", "French, 7 years"]
  Years of Experience: 10
Record #4:
  Skills: ["C# programmer", "Java programmer", "Algorithms"]
  Language proficiencies: ["English, 2 years", "French, 7 years"]
  Years of Experience: 7

In an illustrative exemplary scenario, record #2 may be selected as a reference record, and skills as a reference field (category) for which to predict missing values.

Accordingly, a query may be generated using the reference talent profile (record #2), with one criterion for each value in each field of the reference record as follows:
  Skills criteria (3 values to be matched):
  Match: "C# programmer" OR "Java programmer" OR "Networking"
  Weight: 0.9999
  Language proficiencies (2 values to be matched)
  Match: "English, 5 years" AND "French, 2 years"
  Weight: 0.1
  Years of Experience (a scalar; 1 value to be matched)
  Match: >=10
  Weight: 0.6

Notably the weights reflect an understanding of a relevance and/or relative importance of the data in predicting missing skills. For the skills the relative importance (influence on predicting the missing skills) may be expected to be high. Likewise, it may be expected that language mastery may not be very relevant, while years of experience may impact somewhat, hence the exemplary values used herein.

As there are three record properties in the illustrative exemplary scenario discussed herein, a mapping vector of the search criteria may be denoted as: $A=[A_1, A_2, A_3]$ For the top level the measure of weighted length of the vector may be computed as follows:

$$\text{weighted length} = \frac{\sum_1^n w_i A_i}{\sum_1^n w_i} = \frac{0.9999 A_1 + 0.1 A_2 + 0.6 A_3}{0.9999 + 0.1 + 0.6} = \frac{0.9999 A_1 + 0.1 A_2 + 0.6 A_3}{1.6999}$$

where:
  0.9999 being the positive weight assigned to the skills property,
  0.1 being the positive weight assigned to the language proficiency property,
  0.6 being the positive weight assigned to the Years of Experience property,
  $A_i$ being a computed talent profile match level against the $i^{th}$ criteria: $0 \leq A_i \leq 1$.

Notably two of the properties require computation of a nested weighted length measure for being multi-valued:
  The skills property; using fuzzy OR
  The language proficiency property; using fuzzy AND
  A decay rate R may be defined as follows:
  For skills property (fuzzy OR): 0.8
  For language proficiency property (fuzzy AND): 1.5

Accordingly, the top-level vector elements may be computed as follows:

For $A_1$ (skills):

$$A_1 = \frac{\sum_{1}^{n} w_{1i} R^i A_{1i}}{\sum_{1}^{n} w_{1i} R^i} = \frac{w_{11}(0.8)A_{11} + w_{12}(0.64)A_{12}}{w_{11}(0.8) + w_{12}(0.64)}$$

Similarly, for $A_2$ (language proficiency):

$$A_2 = \frac{\sum_{1}^{n} w_{2i} R^i A_{2i}}{\sum_{1}^{n} w_{2i} R^i} = \frac{w_{21}(1.5)A_{21} + w_{22}(2.25)A_{22}}{w_{21}(1.5) + w_{22}(2.25)}$$

For the weights, $w_{ji}$, a measure of scarcity of a field's value compared to all values in the database may be defined as follows:

$$\text{scarcity measure} = 1 - \frac{\text{count of times the value appears in the field of all records}}{\text{Count of all unique values in the field}}$$

This formula implies that the scarcer the field value, the higher the scarcity value (closer to 1) and therefore the greater impact it may have on the scoring.

However, for simplicity of illustration, instead of the scarcity measure a value of 1 being used uniformly for all the $w_{ji}$ in the worked-out example described herein.

Substituting the appropriate values for $A_1$ and $A_2$:

$$A_1 = \frac{w_{11} R^1 A_{11} + w_{12} R^2 A_{12}}{w_{11} R^1 + w_{12} R^2} =$$

$$\frac{(1)(0.8)A_{11} + (1)(0.64)A_{12}}{(1)(0.8) + (1)(0.64)} = \frac{0.8 A_{11} + 0.64 A_{12}}{1.44}$$

$$A_2 = \frac{w_{21} R^1 A_{21} + w_{22} R^2 A_{22}}{w_{21} R^1 + w_{22} R^2} =$$

$$\frac{(1)(1.5)A_{11} + (1)(2.25)A_{22}}{(1)(1.5) + (1)(2.25)} = \frac{1.5 A_{21} + 2.25 A_{22}}{3.75}$$

Applying the vector elements formulas to record #1:
For Skills:
$A_{11}$ is 1.0 if record #1 has "C# programmer" and 0.0 otherwise (no partial scoring)
$A_{12}$ is 1.0 if record #1 has "Networking" and 0.0 otherwise
For language proficiency:
$A_{21}$ is 1.0 if record #1 has "English, 5 years" (partial scoring if has English <5 years)
$A_{22}$ is 1.0 if record #1 has "French, 2 years" (partial scoring if has French but <2 years)
For years of experience:
$A_3$ is 1.0 if record #1 has at least 10 years of experience (partial scoring if <10 years)

Then, substitution into the top-level formula yields:

$$A_1 = \frac{0.8 A_{11} + 0.64 A_{12}}{1.44} = \frac{0.8(0) + 0.64(1)}{1.44} = \frac{0.64}{1.44} = 0.4444$$

$$A_2 = \frac{1.5(0.6) + 2.25(0)}{3.75} = 0.24$$

Accordingly, the weighted length measure calculation yields:

$$\text{weighted length} = \frac{0.9999 A_1 + 0.1 A_2 + 0.6 A_3}{1.6999} =$$

$$\frac{0.9999(0.4444) + 0.1(0.24) + 0.6(0.8)}{1.6999} = 0.5579$$

Similarly for record #2 the similarity score may be computed as follows:
For skills:
$A_{11}$ is 1.0 if record #2 has "C# programmer" and 0.0 otherwise (no partial scoring)
$A_{12}$ is 1.0 if record #2 has "Networking" and 0.0 otherwise
For language proficiency:
$A_{21}$ is 1.0 if record #2 has "English, 5 years" (partial scoring if has English <5 years)
$A_{22}$ is 1.0 if record #2 has "French, 2 years" (partial scoring if has French but <2 years)
For years of experience:
$A_3$ is 1.0 if record #2 has at least 10 years of experience (partial scoring if <10 years)
Then, substitution into the top-level formula yields:

$$A_1 = \frac{0.8 A_{11} + 0.64 A_{12}}{1.44} = \frac{0.8(1) + 0.64(1)}{1.44} = \frac{1.44}{1.44} = 1.0$$

$$A_2 = \frac{1.5(1) + 2.25(1)}{3.75} = 1.0$$

and, $$\text{weighted length} =$$

$$\frac{0.9999 A_1 + 0.1 A_2 + 0.6 A_3}{1.6999} = \frac{0.9999(1) + 0.1(1) + 0.6(1)}{1.6999} = 1.0$$

The match level of 1.0 may be expected whenever a record being compared against itself.

Similarly, for record #3, the calculation yields:

$$A_3 = \frac{0.8 A_{11} + 0.64 A_{12}}{1.44} = \frac{0.8(1) + 0.64(1)}{1.44} = \frac{1.44}{1.44} = 1.0$$

$$A_2 = \frac{1.5(0.2) + 2.25(1)}{3.75} = \frac{2.55}{3.75} = 0.7846$$

and, $$\text{weighted length} =$$

$$\frac{0.9999 A_1 + 0.1 A_2 + 0.6 A_3}{1.6999} = \frac{0.9999(1) + 0.1(0.7846) + 0.6(1)}{1.6999} = 0.9811$$

And, for record #4, the calculation yields:

$$A_1 = \frac{0.8A_{11} + 0.64A_{12}}{1.44} = \frac{0.8(1) + 0.64(0)}{1.44} = \frac{0.8}{1.44} = 0.5556$$

$$A_2 = \frac{1.5(0.4) + 2.25(1)}{3.75} = \frac{2.85}{3.75} = 0.76$$

and, $$\text{weighted length} = \frac{0.9999(0.5556) + 0.1(0.76) + 0.6(0.7)}{1.6999} = 0.6186$$

After scoring each talent profile record in the database, sorting by descending match scores, the rankings obtained may be as follows:

| | | |
|---|---|---|
| Record #2 | 1.0000 | (perfect match) |
| Record #3 | 0.9811 | |
| Record #4 | 0.6186 | |
| Record #1 | 0.5579 | |

A threshold of top-3 may be defined so the top 3 records (#2, #3, #4) may be retained and weighted counts (weighted by score) of each individual unique skill may be computed, yielding:

$$\text{"C\# programmer"} = \frac{1(1) + 0.9811(1) + 0.6186(1)}{3} =$$

$$\frac{1 + 0.9811 + 0.6186}{3} = \frac{2.5997}{3} = 0.8666$$

$$\text{"Networking"} = \frac{1(1) + 0.9811(1) + 0.6186(0)}{3} =$$

$$\frac{1 + 0.9811}{3} = \frac{1.9811}{3} = 0.6604$$

$$\text{"Java programmer"} = \frac{1(0) + 0.9811(1) + 0.6186(1)}{3} = 0.5332$$

$$\text{"Algorithms"} = \frac{1(0) + 0.9811(1) + 0.6186(1)}{3} = 0.5332$$

$$\text{"Python"} = \frac{1(0) + 0.9811(1) + 0.6186(0)}{3} = 0.3270$$

Setting a derived skills threshold at 0.5, yields prediction of missing skills and associated confidence levels as follows:

"Java Programmer" with confidence level of 53. 32%

"Algorithms" with confidence level of 32.7%

Notably, the skills ["C# programmer", "Networking" ] being already present in the reference talent profile.

Also notably, the skill "python" only appeared once and had a weighted count score which was under the threshold.

Figure 3:
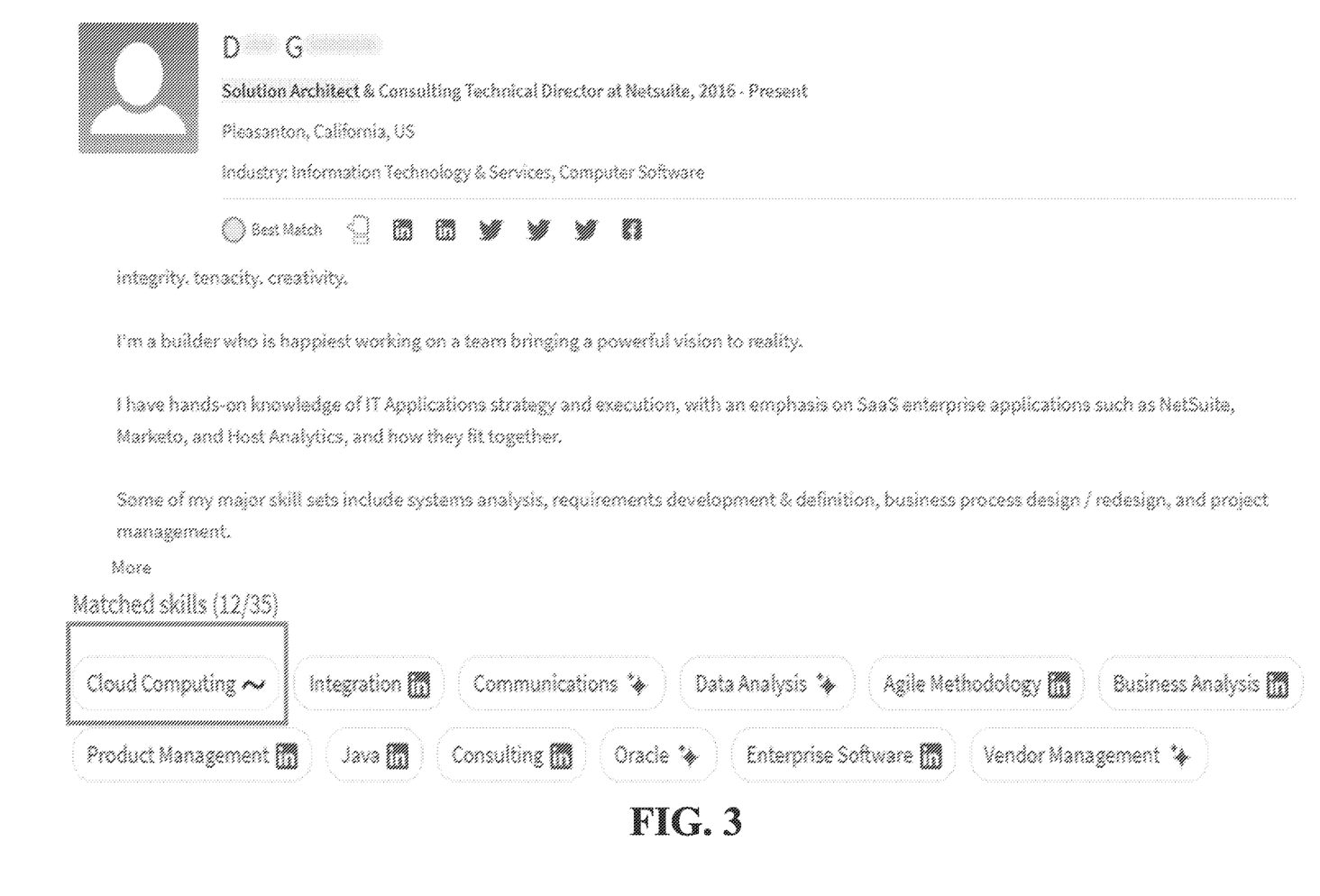
FIG. 3 is an exemplary screen shot of a graphical user interface to a database enhanced using predicted missing data, according to some embodiments.

Reference is now made to FIG. 3, which is an exemplary screen shot of a graphical user interface to a database enhanced using predicted missing data, according to some embodiments.

As shown in FIG. 3, a graphical user interface may be used for reviewing one or more records of a database, such as for example a talent profile retrieved in accordance with a set of search criteria specified. The graphical user interface may display a plurality of data elements, such as for example one or more skills associated with the talent profile, where a subset thereof may be predicted missing skills. An exemplary predicted missing skill and exemplary indication thereof as being a predicted missing skill are depicted in FIG. 3 and marked by a bounding box therearound.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant databases and/or user interfaces thereof incorporating predicted missing data will be developed and the scope of the term "missing data prediction" is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method for database enhancement using missing data prediction, comprising:
    receiving a reference record in a database comprising a plurality of records each comprising a plurality of values divided into a plurality of categories;
    defining a comparison computational operator configured for calculating a similarity score relative to the reference record of a record compared to the reference record, using a plurality of criteria for determining a level of match between values of the record and the reference record in each of the plurality of categories, wherein for a value in a category of the reference record, a respective criterion of the plurality of criteria is configured to search for the value in the category in the record and return a numerical value reflecting a degree of matching;
    for each of a collection of records comprising at least a subset of the database, applying the comparison computational operator to obtain a respective similarity score;
    ranking records of the collection according to the similarity score obtained for the records of the collection and selecting from the records of the collection a sub-collection of top ranked records;
    for each of at least one category selected from the plurality of categories:
        determining a set of predicted values comprising each value in the category included in at least one record of the sub-collection;
        calculating for each value in the set of predicted values a frequency score comprising a count aggregated according to the similarity score of records of the sub-collection including the value in the category;
        selecting from the set of predicted values according to the frequency score calculated for each, a set of missing values in the reference record; and,
        enhancing the reference record using the set of missing values.

2. The method of claim 1, wherein the comparison computational operator being configured for aggregating according to a plurality of relevance parameters the level of match determined in each of the plurality of categories by the plurality of criteria, each of the plurality of relevance parameters being assigned to a respective category of the plurality of categories according to a relative influence of the respective category on predicting missing values in the at least one category selected.

3. The method of claim 1, wherein the comparison computational operator being configured for aggregating multiple criteria in a category according to a scarcity measure of values in records of the collection.

4. The method of claim 1, wherein the comparison computational operator being configured for aggregating multiple criteria in a category according to a function series of a decay rate parameter.

5. The method of claim 1, wherein the reference record comprising at least one nested value in at least one nesting level, wherein the comparison computational operator being configured for applying the plurality of criteria recursively starting from a maximal nesting level.

6. The method of claim 1, further comprising presenting at least a portion of the set of missing values via a user interface, wherein said presenting comprising indicating values of the at least a portion of the set of missing values being presented as being predicted values missing from the reference record.

7. A method for enhancement of a user interface to a database using missing data prediction, comprising:
    receiving a reference record in a database comprising a plurality of records each comprising a plurality of values divided into a plurality of categories;
    generating a plurality of criteria for determining a level of match between values of the reference record and a record compared to the reference record in each of the plurality of categories;
    defining using the plurality of criteria a comparison computational operator configured for calculating a similarity score of the compared record relative to the reference record, wherein for a value in a category of the reference record, a respective criterion of the plurality of criteria is configured to search for the value in the category in the record and return a numerical value reflecting a degree of matching;
    applying the comparison computational operator to each of a collection of records comprising at least a subset of the database;
    ranking records of the collection according to the similarity score obtained from applying the comparison computational operator and selecting a sub-collection of top ranked records from the records of the collection;
    for each of at least one category selected from the plurality of categories:
        determining a set of predicted values comprising each value in the category included in at least one record of the sub-collection;
        calculating for each value in the set of predicted values a frequency score comprising a count aggregated according to the similarity score of records of the sub-collection including the value in the category;

selecting from the set of predicted values according to the frequency score calculated for each, a set of missing values in the reference record; and, presenting via the user interface at least a portion of the set of missing values.

8. The method of claim 7, wherein said presenting comprising indicating values of the at least a portion of the set of missing values being presented as being predicted values missing from the reference record.

9. The method of claim 7, wherein the comparison computational operator being configured for aggregating according to a plurality of relevance parameters the level of match determined in each of the plurality of categories by the plurality of criteria, each of the plurality of relevance parameters being assigned to a respective category of the plurality of categories according to a relative influence of the respective category on predicting missing values in the at least one category selected.

10. The method of claim 7, wherein the comparison computational operator being configured for aggregating multiple criteria in a category according to a scarcity measure of values in records of the collection.

11. The method of claim 7, wherein the comparison computational operator being configured for aggregating multiple criteria in a category according to a function series of a decay rate parameter.

12. The method of claim 7, wherein the reference record comprising at least one nested value in at least one nesting level, wherein the comparison computational operator being configured for applying the plurality of criteria recursively starting from a maximal nesting level.

13. A computer program product for database enhancement using missing data prediction, comprising:
a non-transitory computer readable storage medium;
program instructions for executing, by a processor, the method of claim 1.

14. A computer program product for enhancement of a user interface to a database using missing data prediction, comprising:
a non-transitory computer readable storage medium;
program instructions for executing, by a processor, the method of claim 7.

15. A system for database enhancement using missing data prediction, comprising:
a processing circuitry adapted to execute a code for performing the method of claim 1.

16. A system for enhancement of a user interface to a database using missing data prediction, comprising:
a processing circuitry adapted to execute a code for performing the method of claim 7.

* * * * *